# 3,000,930
α-CHLOROTOLYL BENZOATES
Laurence A. Pursglove, Midland, Mich., assignor to The Dow Chemical Company, Midland, Mich., a corporation of Delaware
No Drawing. Filed Sept. 3, 1958, Ser. No. 758,673
5 Claims. (Cl. 260—476)

The present invention is concerned with aromatic esters of benzoic acid and is particularly directed to certain novel α-chloro-o-tolyl benzoates and substituted benzoates corresponding to the formula

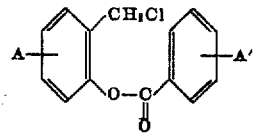

In this and succeeding formulas herein, each of A and A' is independently selected from the group consisting of hydrogen, nitro, chlorine, and bromine. The substituent A may be located in the 2, 3, 4, or 5 position and the substituent A' may be located in any but the 1' position, on their respective benzene rings.

These compounds are crystalline solids soluble in many common organic solvents such as chlorinated hydrocarbons, lower alkanols, and lower alkyl ethers, but of very limited solubility in water. The present compounds are useful as parasiticides and are adapted to be employed to control insects such as flies and cockroaches; fungi such as both early and late blights of tomatoes; and, microorganisms which account for the decomposition and spoilage of many materials such as wood, leather, fabric, and the like.

The compounds of the present invention may be prepared by reacting two molecular proportions of chlorine with one molecular proportion of an o-tolyl benzoate corresponding to the formula

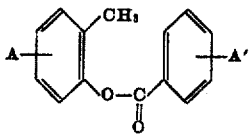

in the presence of a phosphorus chloride such phosphorus trichloride or phosphorus pentachloride, and at a temperature in the range of 20° C. to 150° C. The reaction may be carried out in the absence of, or preferably in the presence of moderate levels of radiant energy such as ultraviolet radiation or visible light.

In such preparation the reaction takes place smoothly with the production of the desired product and hydrogen chloride of reaction. The preparation is carried out in an apparatus equipped for the disposal of such hydrogen chloride as a gas. At lower temperatures within the stated range, the desired chlorination takes place very slowly, whereas at higher temperatures within the said range, undesired byproducts are formed and purification of the desired products become increasingly difficult. Temperatures of above about 150° C., if employed for any appreciable period of time result in decreased yield of the α-chloro-o-tolyl benzoate product, and increased formation of undesired byproducts. The reaction temperature range in which the desired product is prepared promptly and in good yields with minimum amounts of byproducts, and is, therefore, the preferred temperature range, is between 90°–120° C. The reaction may be carried out, if desired, in an inert liquid reaction medium which may be a reaction solvent, such as, tetrachloroethylene, carbon tetrachloride, chlorinated benzenes, and the like. Preferably, no reaction medium is employed.

The phosphorus chloride catalyst is employed in a catalytic amount. Good results are obtained when a total of at least two atomic proportions of chlorine is employed for each molecular proportion of o-tolylbenzoate reactant; not more than 2.5 atomic proportions of chlorine should be employed if it is desired to prepare the α-monochloro compound of the present invention. Preferably about 2.2 atomic proportions of chlorine are employed. Visible or ultraviolet irradiation, if employed during the addition of chlorine, aids chlorination of the methyl group and reduces the tendency towards undesired ring chlorination. The strength of such radiation is not critical; daylight, sunlight, the intercepted proportion of the output of electric lights such as incandescent or fluorescent light in the range of 50 to 500 watts electric power consumption at a distance up to 20 feet have been satisfactory; although desired product has been obtained in good yield when the reaction has been carried out in the absence of light.

In carrying out the chlorination in the present method, the dry chlorine is introduced slowly, portionwise and with dispersion and stirring into a mixture of the o-tolyl benzoate and phosphorus halide catalyst. For this purpose, the chlorine may be introduced by a glass tube to a point under the surface of the mixture in the reaction vessel. The resulting halogenation reaction is exothermic, and may conveniently be carried out at an initial temperature near the lower limit of the stated preferred temperature range. Usually, heat of reaction gradually raises the temperature of the resulting reaction mixture, and addition of chlorine may be carried out at such rate as to raise the reaction mixture temperature to, and maintain it near the upper limit of the preferred temperature range. Upon completion of the reaction, or to effect partial purification of a portion of the reaction mixture to be tested, an inert gas may be bubbled through the mixture to purge it of hydrogen chloride and unreacted chlorine.

Under the stated reaction conditions, the reaction usually takes place virtually instantaneously, and the reaction may be considered to be complete when the reaction mixture, or a portion of it, after inert gas purging, has taken up a weight of chlorine equivalent to the theoretical weight. Thereafter, the desired product may be separated and purified by known procedures. In one such procedure, hydrogen chloride of reaction dissolved in the reaction mixture is purged therefrom by ventilation of the said mixture with portions of an inert gas which may be nitrogen. In the absence of a reaction medium, such purging is sufficient purification to obtain a crude α-chloro-o-tolylbenzoate product. Such product exhibits the stated utilities of the present invention. However, if desired, the crude product may be further purified; for example, it may be recrystallized from a solvent, which may be a lower alkanol or a mixture of lower alkanol and water.

In an alternative method of preparing certain compounds of the present invention, a substituted phenol corresponding to the formula

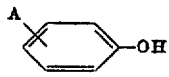

wherein A has the values hereinbefore stated, may be chloromethylated by reaction with formaldehyde or a formaldehyde yielding substance and hydrogen chloride in amounts approximately equimolecular with the substituted phenol, to obtain an α-chloro-o-cresol, which may thereafter be esterified, as with a benzoyl chloride, to obtain a compound of the present invention.

The following examples illustrate the invention but are not to be construed as limiting it.

Example 1—α-chloro-o-tolyl benzoate

Dry chlorine gas was bubbled slowly through a glass tube to a point below the surface of a dispersion of 50 milliliters of phosphorus trichloride in 6 kilograms of o-tolyl benzoate which was continuously stirred at approximately 90° C. Heat of reaction raised the temperature of the resulting reaction mixture to about 115° C. Stirring was thereafter continued and the rate of addition of chlorine as well as the rate of external heating were adjusted to maintain the reaction temperature at approximately 115° C. throughout the further time required to take up 2,250 grams total, of chlorine. During the course of the addition of chlorine, hydrogen chloride of reaction was formed. Portions of this hydrogen chloride dissolved in the reaction mixture, and upon saturation thereof further hydrogen chloride escaped as a gas which was passed through a scrubbing tower and was neutralized therein by addition of a solution of sodium hydroxide. Upon completion of the addition of the stated amount of chlorine, which was approximately the atomic equivalent, the reaction mixture was allowed to cool slowly and over a period of time to a lower temperature in the range of 70°–100° C. during which time the mixture was purged by bubbling nitrogen gas through it, through the tube previously employed for introduction of chlorine. By this means, a major proportion of dissolved hydrogen chloride of reaction was removed, to obtain a crude α-chloro-o-tolyl benzoate product. This product was found upon analysis to contain 15 percent hydrolyzable chlorine in comparison with a theoretical 14.4 percent. A portion of the crude product was taken up in a methanol-water mixture and a purified product crystallized therefrom to obtain a α-chloro-o-tolyl benzoate product, melting at 65°–66.5° C.

In a similar manner, a o-nitro-α-chloro-o-tolyl benzoate product is prepared. o-nitro-α-chloro-o-tolyl benzoate is a crystalline solid melting at 88° to 91° C.

In a further preparation in the manner of Example 1, there was prepared a crude α-4-dichloro-o-tolyl benzoate product approximately 90 percent pure as a waxy semi-solid substance melting in the range of 30° to 55° C. In yet another preparation in the manner of Example 1 there was prepared a crude α-chloro-o-tolyl-p-chlorobenzoate product as a pale yellow liquid. This crude liquid contained a total of 25.05 percent chlorine by weight as compared to theoretical 25.2 percent and 12.07 percent hydrolyzable chlorine by weight as compared to theoretical 12.6 percent. In other preparations carried out in the manner of Example 1, the following products are prepared.

By chlorination of 5-nitro-o-tolyl 3-bromobenzoate, a 5-nitro-α-chloro-o-tolyl 3-bromobenzoate product;

By chlorination of 2-nitro-o-tolyl 2-chlorobenzoate, 2-nitro-α-chloro-o-tolyl 2-chlorobenzoate product;

By chlorination of a 4-bromo-o-tolyl 5-nitrobenzoate, a 4-bromo-α-chloro-o-tolyl 5-nitrobenzoate product;

By chlorination of 3-bromo-o-tolyl 4-bromobenzoate, a 3-bromo-α-chloro-o-tolyl 4-bromobenzoate product;

By chlorination of 4-chloro-o-tolyl m-chlorobenzoate, a 4-chloro-α-chloro-o-tolyl 3-chlorobenzoate product.

Other products of this invention are produced in similar manners.

The compounds of the present invention are useful as insecticides. For such use, the unmodified compounds may be used. Alternatively, the compounds may be dispersed on an inert finely divided solid and the resulting preparation employed as a dust. Also, such preparations may be dispersed in water with or without the aid of a wetting agent and the resulting aqueous suspensions employed as sprays. In other procedures, the compounds may be employed in oil or other solvent or as a constituent of solvent-in-water or water-in-solvent emulsions or as aqueous dispersions thereof which may be applied as spray, drench, or wash. In a representative operation, a major proportion of a population of houseflies was killed as a result of thorough wetting by an application of an aqueous dispersion of an acetone solution of α-chloro-o-tolyl benzoate at the rate of 1 pound of toxicant per 100 gallons of ultimate composition whereas a similar population of houseflies treated identically except that the present benzoate compound was not employed showed no mortality.

The o-tolyl benzoate starting materials employed in the practice of the present invention are prepared in known procedures. In one such procedure, a benzoyl chloride corresponding to the formula

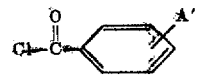

is added slowly, portionwise, and with stirring to the o-cresol corresponding to the formula

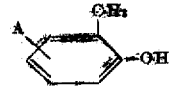

at temperatures in the range of 90° to 150° C. in the presence of a reaction medium such as a chlorobenzene, if desired. Heating and stirring are thereafter continued for a total time of 1 to 4 hours to carry the reaction to completion, to obtain the desired benzoate and hydrogen chloride of reaction. Thereafter, the reaction mixture may be distilled under reduced pressure to obtain in purified form the desired product which may then be employed as a starting material in the described procedures of the present invention; if solid, they may be purified by crystallization from solvent and may thereafter be employed in the procedures of the present invention.

Various modifications of the process and products of the present invention may be made without departing from the spirit or scope thereof, and it is to be understood that I limit myself only as defined in the appended claims.

I claim:
1. A compound corresponding to the formula:

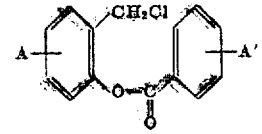

wherein each of A and A' is independently selected from the group consisting of hydrogen, bromine, chlorine, and a nitro group.

2. α-Chloro-o-tolyl benzoate.
3. 4-nitro-α-chloro-o-tolyl benzoate.
4. α,4-dichloro-o-tolyl benzoate.
5. α-Chloro-o-tolyl p-chlorobenzoate.

References Cited in the file of this patent

FOREIGN PATENTS 773,131     Great Britain    Apr. 24, 1957

OTHER REFERENCES

Jacobs et al.: J. Biol. Chem., 20, 672–3 (1915).
Segusser: J. Am. Chem. Soc., 64, 825–6 (1942).
Hickinbottom: "Reactions of Organic Compounds," pages 59, 60 and 61, Longmans, Green & Co., 1948.
Helferich et al.: Ber., 83, 569–70 (1950).
Goldberg et al.: J. Chem. Soc., 2540–1 (1954).